3,086,945
CATALYTIC DECOMPOSITION OF 1,1-DIMETHYLHYDRAZINE

Johann G. E. Cohn, West Orange, N.J., assignor, by mesne assignments, to Engelhard Industries, Inc., Newark, N.J., a corporation of Delaware
No Drawing. Filed July 16, 1959, Ser. No. 827,441
6 Claims. (Cl. 252—372)

This invention relates to the catalytic decomposition of unsymmetrical dimethylhydrazine (UDMH) and, more particularly, to the catalytic decomposition of UDMH in the presence of a platinum group metal-containing catalyst.

UDMH serves as a monofuel suitable to operate auxiliary electric power plants for missiles without danger of overheating. The heat of decomposition of UDMH is unsufficient to render it useful as a monopropellant for rockets, and its use as a rocket fuel has been in combination with an oxidizer.

UDMH has been reported to have a boiling point of 63° C. at 717 mm.; it has also been reported to decompose exothermally. Its basic strength in water is similar to that of ammonia and, apparently, is slightly greater than the basic strength of hydrazine; the pH strength of an N/10 normal solution is about 11.5.

In accordance with the present invention, a catalytic process is provided for the decomposition of UDMH whereby the decomposition may be effected at a controlled rate and at a lower temperature than was heretofore required in the decomposition of UDMH in the presence of an oxidizer.

For applications of UDMH as a monofuel with catalytic decomposition, formed catalysts stable at temperatures up to about 1200° C., and subject to a minimum of disintegration or dusting, are preferred. Preferred catalyst carriers include thorium oxide, titanium dioxide, zirconium oxide, alumina, silica, silica-alumina combinations, magnesia, asbestos and carbon, and of these the more refractory and physically stable materials are preferred. Since the atmosphere is reducing, high strength forms of granular carbon may be employed.

The platinum metal concentration on the catalyst carrier may vary within wide limits, as shown in the example below. Platinum metal sponge is active, whereas the massive metal is relatively inactive. The sponge, however, is physically unsuitable for use in rockets or missiles. The concentration of platinum group metal on the carrier may be varied between 0.1 and 50 percent or more, by weight, of the combined weight of catalyst and carrier, but for economic reasons, the lower concentrations are preferred.

A suitable space velocity for use as a monofuel to operate electrical equipment in a missile is in the range of about 800 to 2000 standard volumes of gas per volume of catalyst per hour. The decomposition may be initiated by relatively slow escape of UDMH through a nozzle from a pressurized tank. Higher space velocities are generally used as the catalyst is heated by the exothermic reaction to higher temperatures. Some thermal decomposition may occur at the higher temperatures.

The temperature for initiating the reaction may be in the range of about 100 to 500° C., preferably about 200 to 400° C., and the reaction pressure may be in the range of subatmospheric to 500 p.s.i.g. or higher.

A carrier gas may be employed, if desired, such as hydrogen, helium or nitrogen, and the UDMH may be present in the carrier gas in a quantity in the range of about 0.1 percent, by volume, or in any other higher concentration up to 100 percent UDMH, i.e., complete absence of a carrier gas.

The invention will be further illustrated by reference to the following specific example:

EXAMPLE I

A conventional vapor phase chromatography unit having a 12-foot molecular sieve column was used to show the decomposition of UDMH over various platinum group metal-containing catalysts.

Hydrogen, nitrogen and helium were used as carrier gases, at flow rates adjusted to obtain resolution of the decomposition products on a Varian recording unit.

Initially, small quantities of catalysts (about 0.1 gram) and then larger amounts (about 0.5 to 1.0 gram) were placed in a stainless steel reactor, which was heated.

Known quantities of UDMH were introduced by a syringe, carried downstream to the catalyst bed by an appropriate carrier gas and then to the molecular sieve column. A thermoconductivity cell registered any differences with respect to the carrier gas.

Tests made initially at a temperature of 300 to 330° C., and using hydrogen as a carrier, produced, for most catalysts, one small and one relatively large peak, the latter emerging shortly after the first. Blank tests with nitrogen and methane and appropriate carriers identified the first peak as nitrogen, and the second as methane. The molecular sieve column did not pass either UDMH or ethane. Hydrogen also was identified with nitrogen as a carrier.

The thermoconductivity of hydrogen is approximately seven times greater than that of nitrogen or methane at 40° C., while nitrogen is slightly lower than methane. For equal amounts, nitrogen and methane peak areas should be similar. Experimental results with hydrogen as the carrier revealed methane peaks, in general, considerably greater than nitrogen peaks, which disclosed the fact that the quantity of methane released was greater than nitrogen. Conversely, using nitrogen as the carrier, a small quantity of hydrogen would produce a large peak relative to the methane, even if a large quantity of the latter were present. Experimental runs 1 and 2 in the table below under Nitrogen Carrier show this effect. Accordingly, no estimation was possible concerning the quantity of hydrogen released without an appropriate calibration.

Because traces of oxygen can promote degradation of UDMH by oxidative attack, it was found convenient to conduct the majority of the runs in the table below using hydrogen as the carrier gas rather than helium. Oxygen thus reacts with hydrogen and does not effect the decomposition of UDMH. However, under these conditions hydrogenation is a possible reaction in addition to decomposition. (By decomposition is meant breakdown of a UDMH molecule into fragments without reaction with an additional substance such as hydrogen.) Examples of these two types of reactions are listed below:

*Decomposition Reactions*

(1) $(CH_3)_2NNH_2 \rightarrow 2CH_4 + N_2$
(2) $\rightarrow CH_3-CH_3 + N_2 + H_2$
(3) $\rightarrow 2C + 2NH_3 + H_2$
(4) $\rightarrow CH_4 + C + NH_2-NH_2$*
etc.

* If hydrazine is formed it undoubtedly undergoes further reaction.

*Hydrogenation Reactions*

(5) $(CH_3)_2NNH_2 + 2H_2 \rightarrow 2CH_4 + NH_2-NH_2$*
(6) $(CH_3)_2NNH_2 + 4H_2 \rightarrow 2CH_4 + 2NH_3$

* If hydrazine is formed it undoubtedly undergoes further reaction.

It should be noted that reactions (1) and (2) are more

The data and results are as follows:

TABLE I

Catalysts for Decomposition of Dimethylhydrazine

| Catalyst | Operating conditions | | | | Approx. mol. ratio, $CH_4/N_2$ | Estimated relative conversion to $N_2$ |
|---|---|---|---|---|---|---|
| | Run No. | Gm. cat. | Sample, gm. | Temp., °C. | | |
| HYDROGEN CARRIER | | | | | | |
| 10% Rh granular carbon | 1 | 0.7 | 0.058 | 152–160 | 300 | Small. |
| | 2 | 0.1 | | 335 | 20 | Do. |
| 30% Rh, asbestos | 3 | 0.7 | 0.079 | 100 | 20 | Do. |
| | | | 0.079 | 140 | 90 | Do. |
| | | | 0.079 | 220 | 10 | Large. |
| | 4 | 0.1 | 0.079 | 260 | 1 | Small. |
| | | | 0.079 | 315 | 1 | Do. |
| | | | 0.079 | 340 | 1 | Medium. |
| 10% Pt, asbestos | 5 | 0.1 | 0.079 | 310 | 5 | Do. |
| 20% Pt, carbon | 6 | 0.7 | 0.039 | 310 | 30 | Small. |
| | | | 0.059 | 340 | 20 | Medium. |
| 50% Pt, $ThO_2$ | 7 | 0.7 | 0.079 | 180 | 70 | Small. |
| | 8 | 0.1 | 0.059 | 340 | 20 | Medium. |
| | | | 0.079 | 360 | 20 | Do. |
| 5% Ir, carbon | 9 | 0.7 | 0.079 | 210 | 250 | Small. |
| | 10 | 0.1 | 0.059 | 330 | 8 | Medium. |
| | | | 0.059 | 335 | 5 | Do. |
| 30% Pd, carbon | 11 | 0.7 | 0.059 | 210 | 50 | Small. |
| | | | 0.079 | 270 | 200 | Do. |
| | | | 0.059 | 360 | 100 | Do. |
| | 12 | 0.1 | 0.079 | 330 | 8 | Medium. |
| | | | 0.059 | 330 | 5 | Do. |
| 10% Ru (as $Ru_2$), carbon: | | | | | | |
| (1) Unreduced | 13 | 0.1 | 0.079 | 320 | 30 | Do. |
| | | | 0.079 | 330 | 40 | Small. |
| | | | 0.079 | 335 | 60 | Medium. |
| (2) Reduced ($H^2$, 1 hr., 600 °C.) | 14 | 0.7 | 0.079 | 155 | 200 | Small. |
| | | | 0.059 | 160 | 150 | Do. |
| | | | 0.079 | 210 | 50 | Medium. |
| | 15 | 0.1 | 0.059 | 340 | 10 | Do. |
| | | | 0.058 | 360 | 30 | Small. |
| HELIUM CARRIER | | | | | | |
| 10% Rh, granular carbon | 1 | 0.7 | 0.059 | 250 | 1 | Large. |
| | | | 0.059 | 280 | 2 | Do. |
| NITROGEN CARRIER | | | | | | HYDROGEN PEAK |
| 5% Ir, carbon | 1 | 0.1 | 0.059 | 370 | Very large. | |
| 10% Rh, granular carbon | 2 | 0.7 | 0.079 | 140 | Small. | |
| | | | 0.039 | 120 | Do. | |
| | | | 0.039 | 140 | Medium. | | desirable than (3) or (4) in that no coke is formed. It should also be noted that the different reactions produce different relative amounts of nitrogen and methane. Reaction (1) gives a methane to nitrogen ratio of two, while reaction (2) gives nitrogen, but no methane. Thus, by examination of the ratio of methane to nitrogen in addition to the amount of nitrogen produced, the reaction path can be analyzed. The data in the table below show that all the catalysts tested were active for the demethanation of UDMH. However, only the two asbestos-supported catalysts gave a methane to nitrogen ratio of two or less in the presence of hydrogen. All others gave largely methane indicating that reactions (5) and (6) predominated over reactions (1) and (2) above. Of the carbon catalysts, palladium and iridium gave the lowest ratio of methane to nitrogen (about 5 to 1).

One run was made using helium as the carrier gas and, in this run, the rhodium on carbon catalyst gave much better results than in the run where hydrogen was used as the carrier gas. It appears that traces of oxygen promote the desired reaction. Using a nitrogen carrier to detect the production of hydrogen, this same catalyst gave measurable hydrogen peaks at low temperatures. This result is in accordance with the methane-nitrogen ratio of one found in the lower temperature helium test.

As shown by the very large hydrogen peak in the nitrogen carrier gas test, the iridium catalyst also causes substantial decomposition of UDMH in a non-reducing atmosphere. It is likely that reaction is initiated by oxygen present on the catalyst surface.

It will be obvious to those skilled in the art that many modifications may be made within the scope of the present invention without departing from the spirit thereof, and the invention includes all such modifications.

What is claimed is:

1. A process for the vapor phase decomposition of unsymmetrical dimethylhydrazine which comprises contacting the unsymmetrical dimethylhydrazine vapors with a platinum group metal-containing catalyst, at reaction temperature.

2. A process according to claim 1 in which the catalyst is supported on a carrier.

3. A process according to claim 1 in which the catalyst is supported on an asbestos carrier.

4. The process according to claim 1 in which the unsymmetrical dimethylhydrazine vapors are in admixture with a trace amount of oxygen.

5. A process according to claim 1 in which the temperature for initiating reaction is in the range of about 100 to 500° C.

6. A process according to claim 1 in which the reaction pressure is in the range of subatmospheric to about 500 p.s.i.g.

References Cited in the file of this patent

UNITED STATES PATENTS

| 1,326,767 | Moore | Dec. 30, 1919 |
| 2,808,439 | Barrett et al. | Oct. 1, 1957 |
| 2,925,709 | Mantell et al. | Feb. 23, 1960 |

OTHER REFERENCES

Parravano: "J.A.C.S.," 72, 3856–60 (1950).
Audrieth et al.: "J. Phys. and Colloid Chem.," 55, 524–31 (1951).